United States Patent [19]

Gaudino

[11] Patent Number: 4,930,211

[45] Date of Patent: * Jun. 5, 1990

[54] SILVER ELECTRODE FOR ELECTROCHEMICAL CELL

[75] Inventor: Larry J. Gaudino, Greensboro, N.C.

[73] Assignee: Technitrol, Inc., Wyndmoore, Pa.

[*] Notice: The portion of the term of this patent subsequent to Jul. 4, 2006 has been disclaimed.

[21] Appl. No.: 208,433

[22] Filed: Jun. 20, 1988

[51] Int. Cl.$^5$ ............................................. H01M 6/00
[52] U.S. Cl. .................................... 29/623.5; 429/219
[58] Field of Search ................. 29/623.1, 623.3, 623.5; 419/38, 65; 429/210, 219, 209; 427/369, 370, 405

[56] References Cited

U.S. PATENT DOCUMENTS

| | | | |
|---|---|---|---|
| 3,953,239 | 4/1976 | Anderson | 429/120 |
| 4,091,184 | 5/1978 | Erisman et al. | 429/210 X |
| 4,107,406 | 8/1978 | Moden et al. | 429/218 |

*Primary Examiner*—Anthony Skapars
*Attorney, Agent, or Firm*—Armstrong, Nikaido, Marmelstein, Kobovcik & Murray

[57] ABSTRACT

A silver electrode comprises a layer of porous battery grade silver powder bonded to a metal substrate by means of an adhesive layer of fine silver powder and glass frit therebetween.

3 Claims, No Drawings

SILVER ELECTRODE FOR ELECTROCHEMICAL CELL

This invention concerns silver electrodes for electrochemical cells or batteries. In some high discharge rate electrochemical cells, a silver oxide electrode is used. Such an electrode is fabricated from silver powder of controlled morphology to provide suitable porosity to the silver electrode. The silver is then converted to silver oxide by anodic oxidation. Suitable porosity permits a high yield of conversion of the silver to silver oxide, and provides high electrochemical efficiency.

This invention provides a method of making a silver electrode without significantly affecting the morphology of the silver powder in order to obtain the desired porosity in the finished electrode.

In this invention, a substrate for the porous silver electrode is provided. The substrate is a thin metal foil, say, copper or nickel 2 to 5 mils thick, coated with a thin layer of silver on one side. The silver can be electroplated or roll bonded and can be about 0.2 to 0.5 mils thick. Next, a thick film adhesive paste is evenly spread onto the silver side of the substrate to a thickness of about 0.75 to 1.25 mils. The paste comprises about 70 to 85% of fine silver powder, the balance of the solids being a finely powdered glass frit which melts at a temperature below about 600° C. Liquid binder and solvent are added to provide paste consistency.

To the uncured adhesive paste, battery grade silver powder is directly applied by either mold pressing or rolling techniques to a thickness of, say, 1 or 2 mm. Battery grade silver powder usually consists of large 50 to 150 micron diameter agglomerates and having finer 4 to 10 micron diameter internal particle sizes. The silver powder disclosed in U.S. Pat. No. 4,753,782 may be used. Firing at 600° C. produces good adhesion between the substrate and the silver powder without significant deleterious effect on the porosity of the silver.

In one example, battery grade silver powder was mold pressed at 1000 psi onto a silver coated 4 mil thick nickel substrate evenly coated with a 1 mil thick layer of Type 3350 thick film paste manufactured by Thick Film Systems. The product was sintered at 600° C. for 20 minutes. Charge-discharge efficiency studies were done in a 45% KOH electrolyte using a Hg/HgO reference electrode placed between the silver and nickel counter electrodes. Based on silver weight and a discharge rate of 0.25 amp/sq. in., calculated discharge capacity averaged 27 amp.-min./gram. Adhesive strength between the silver electrode and the nickel substrate was capable of supporting the porous cathode material after several charge-discharge cycles.

When this procedure was followed but without the intermediate adhesive layer, the cathode-substrate bond separated after sintering. When the procedure was followed again without the intermediate adhesive layer, but the pressure was increased to 6000 psi and the sintering temperature was increased to 800° C., a coarsened morphological structure resulted. The discharge capacity deteriorated to 16 amp.-min./gram. After a single discharge cycle, the nickel substrate material separated from the porous silver cathode.

I claim:

1. The method of making a porous silver electrode for an electrochemical cell comprising the steps of providing a metal substrate having a thin coating of silver thereon, depositing on the silver side of the substrate a thin layer of a thick film paste, the paste comprised of powdered glass frit and fine silver powder, the glass frit having a melting temperature below about 600° C., pressing onto the paste layer a layer of battery grade silver powder, and firing the combination at about 600° C. to bond the battery grade silver powder to the metal substrate.

2. The method of claim 1 including the step of anodic oxidizing the electrode in order to convert the silver to silver oxide.

3. An electrode for an electrochemical cell comprising a layer of porous battery grade silver powder bonded to a metal substrate by means of an adhesive layer therebetween, the adhesive layer comprising a mixture of fine silver powder and powdered glass frit which has a melting temperature below about 600° C.

* * * * *